UNITED STATES PATENT OFFICE.

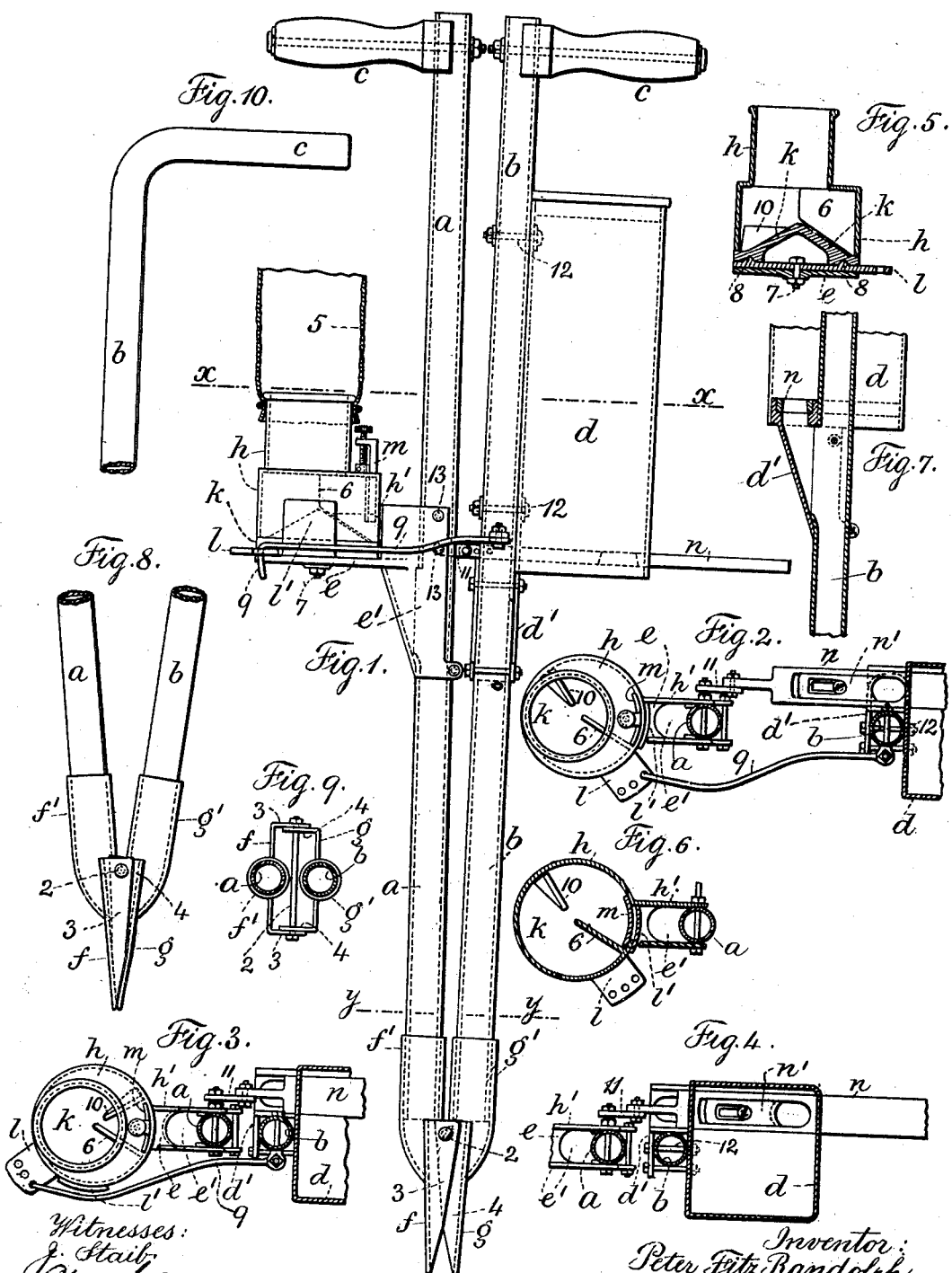

PETER FITZ RANDOLPH, OF LIBERTY CORNER, NEW JERSEY.

SEED-PLANTER AND FERTILIZER-DISTRIBUTER.

SPECIFICATION forming part of Letters Patent No. 668,912, dated February 26, 1901.

Application filed December 8, 1900. Serial No. 39,124. (No model.)

*To all whom it may concern:*

Be it known that I, PETER FITZ RANDOLPH, a citizen of the United States, residing at Liberty Corner, in the county of Somerset and State of New Jersey, have invented an Improvement in Seed-Planters and Fertilizer-Distributers, of which the following is a specification.

Heretofore seed-planters and fertilizer-distributers have been mounted upon two frame parts pivoted together and adapted to move toward and from one another, the movement of the frame parts causing the operation of the devices of the seed-planter and fertilizer-distributer so as to drop the seed and the fertilizer at the proper time. These devices were not fully efficient and operative and, besides, when made of wood were liable to warp, twist, and get out of shape and in a short time become practically useless.

In an application, Serial No. 39,125 and filed by me of even date herewith, I have described and illustrated pivoted frame parts that were of metal and tubular throughout and to which parts the seed and fertilizer receptacles were adapted to be connected, and my present invention, in connection with such tubular metal frame parts, relates, essentially, to the seed-planter and fertilizer-distributer and the devices by which the same are connected to the tubular metal parts and operated.

The seed-planter is provided with a slide-bar having an opening the size of which can be regulated, and the same is secured to one of the tubular frame parts, and the slide-bar thereof is connected to the other frame part by a link, so as to move into the seed-receptacle and bring therefrom the desired number of seeds and deliver them through the tubular frame part to the ground.

The fertilizer-distributer is circular and is provided with a conical feeder to which a rotary back-and-forth or oscillating movement is imparted. The fertilizer-receptacle is connected to the tubular frame part adjacent to the frame part carrying the seed-receptacle, and the said conical feeder is actuated by an arm extending therefrom to a pivotal connection with the tubular frame part carrying the seed-receptacle, the details of the parts being hereinafter more particularly set forth.

In the drawings, Figure 1 is an elevation representing my improvement complete. Fig. 2 is a sectional plan at $x\ x$ of Fig. 1 with the tubular frame parts in their extreme separate position. Figs. 3 and 4 are sectional plans and companion figures at the said line $x\ x$ with the frame parts in their extreme position toward one another. Fig. 5 is a vertical section through the fertilizer-distributer. Fig. 6 is a sectional plan of the same. Fig. 7 is a vertical section through one frame part and tubular connection and elevation of the seed-holder. Fig. 8 is an elevation at the lower blade end of the tubular frame parts with the blade ends close to one another and the frame parts spread. Fig. 9 is a cross-section at $y\ y$ of Fig. 1, and Fig. 10 represents a modification of the tubular frame parts at the upper or handle end.

As stated in my application hereinbefore referred to, the frame parts $a\ b$ are preferably composed of metal tubes in one piece from the upper end to the blades, with handles $c$ at the upper ends of said tubular frame parts, by which the said parts are moved toward or from one another.

In Fig. 1 the handles $c$ are shown as separate parts from the tubular frame parts, while in the modified form, Fig. 10, the frame parts may be bent over into straight parts at approximately right angles to the main portion to form handles, or such frame parts may be provided with grips secured thereto.

Blade ends $f\ g$ are each provided with an integral tubular socket $f'\ g'$, extending upward from one surface of the blade ends, with an opening through the blade, the tubular socket being slightly larger than the tubular frame part to receive the frame part, the said frame part being secured thereto in any desired manner. The said blade ends are provided with flanges 3 4, and one of the blade ends is preferably wider than the other, so that the flanges overlap, and a pivot-pin 2 passes across between the blade ends and through the flanges to pivotally connect the tubular frame parts, so that on the pivot-pin they can be swung toward or from one another.

The seed-holder $d$ is preferably an elongated sheet-metal box substantially square in cross-section and secured by bolts 12 to the tubular frame part $b$. The seed-holder is provided with a tubular connection $d'$, extending below one corner thereof and connecting with an opening in the frame part $b$. The opening in the tubular portion $d'$ is preferably outside of the seed-holder $d$, and I provide a slide-bar $n$, moving across through the lower portion of the seed-holder and the upper portion of the tubular connection $d'$. The slide-bar is provided with an opening made adjustable by the plate $n'$, so that the size of the opening can be regulated. The reduced end of the slide-bar is pivotally connected by a link 11 to the tubular member $a$, and the slide-bar $n$ moves back and forth through the seed-holder with the movements of the tubular frame part. Figs. 3 and 4 show the position of the slide-bar $n$ with reference to the seed-holder $d$ when the frame parts are close together. In this position a certain number of seeds can enter the opening in the slide-bar, and the same are drawn from the seed-holder in the position Figs. 3 and 4 to the position of the slide-bar in Fig. 2, wherein the opening in the slide-bar is directly above the opening in the tubular connection $d'$, and at this moment the seeds drop from the opening in the slide-bar, through the tubular connection, and into the tubular frame part $b$, falling through the same to the ground.

The fertilizer-receptacle consists of a cylindrical portion $h$, shown as of varying diameter. The upper end or smaller portion has connected to it the lower end of a bag 5, holding the fertilizer. This cylindrical portion $h$ is formed with an integral flange $h'$, which extends forward to one side of the tubular frame part $a$. A platform comes below the lower edge of the cylindrical portion $h$, and said platform is made with a flanged tubular spillway $e'$, extending to the opposite side of the tubular member $a$, the parts $h'$ and $e'$ being fastened together and to the tubular frame part $a$ by bolts 13, said fastening also holding the cylindrical portion $h$ and the platform $e$ in a fixed relation to one another, so that there is a space between the surface of the platform and the under surface of the cylindrical portion $h$. This space is occupied by the periphery of a conical feeder $k$ and a base $l$, the conical feeder rising within the cylindrical portion $h$ and having recesses in its under surface filled by projections 8, rising from the base $l$. The base $l$ is connected by a bolt 7 to the platform $e$. Thus the base is firmly and pivotally connected to the platform and adapted to turn on the bolt 7, and at the same time the relation of the conical feeder $k$ is maintained to the base $l$ by the projections and the fact that the edge of the conical feeder comes below the edge of the cylindrical portion $h$. I employ a rod 9, extending from a projection of the base $l$ to a pivotal connection with the tubular frame part $b$, so that with the back-and-forth movement of the frame parts upon the pivot 2 the rod 9 imparts a back-and-forth turning movement to the base $l$ and the conical feeder $k$. The cylindrical portion $h$ is provided with an internal integral flange 6, the conical feeder $k$ with an integral flange 10, and the base $l$ with a curved separator $l'$, adapted to move between the exterior surface of the cylindrical portion $h$ and a vertical edge of the flanged tubular spillway $e'$ to close an opening in the cylindrical portion $h$, that permits the fertilizer to escape between the flange $h'$ and the flange of the spillway $e'$. I provide an adjustable gate $m$, movable vertically within the cylindrical portion $h$, the same having an external feed-screw for raising and lowering and holding the same in position as adjusted, the said gate serving the office of regulating the quantity of fertilizer delivered through the opening into the spillway.

It will be noticed from the various figures that the seed is drawn from the receptacle $d$ and delivered into and down through the tubular frame part $b$ when the said frame parts are in their extreme separated position, as shown in Fig. 2, and that in this position the opening for the delivery of the fertilizer is closed. From Figs. 3 and 4 it will be noticed that in the extreme position of the tubular frame parts toward one another the slide-bar $n$ has been moved into the seed-holder to take up additional seed and that in the return movement, as between the positions Figs. 2 and 3, the base $l$ and conical feeder $k$ have been given a partial rotation, the curved separator $l'$ moved away from the opening in the cylindrical portion $h$, and the flange 10 moved with the conical feeder from the positions Figs. 2 and 6 to the position Fig. 3, in which a quantity of fertilizer located adjacent to the delivery-opening and between the wall of the cylindrical portion, the internal flange 6, and the flange 10 has been moved by the flange 10 toward the delivery-opening, passing out of the same down the flanged tubular spillway $e'$ and the tubular frame part $a$ to the ground, these operations being progressively repeated with the movements of the tubular frame parts toward and from one another. It will be also apparent that when the frame parts are separated and moved from the position Figs. 3 and 4 to the position Fig. 2 that the conical feeder $k$ is returned to the position Fig. 2, permitting the fertilizer to fall from the upper part of the cylindrical receptacle $h$ for delivery with the further movements of the device, it being a fact that the devices of the improvement operate with each swinging movement of the pivoted frame parts toward and from one another, in one position feeding the seed and in the other the fertilizer, the seed being fed first and the fertilizer afterward, the fertilizer falling upon the earth and the seed.

I prefer with the devices of the present invention to form the conical feeder $k$ and its flange 10 of some non-corroding material, such as glass or porcelain, in view of the fact that the instrument is subject to exposure in heat, cold, and moisture. This is done with the idea of preventing any accumulation of rust that would be liable to interfere with the ready movement of the parts.

I claim as my invention—

1. In a seed-planter and fertilizer-distributer, the combination with tubular metal frame parts pivoted together, a fertilizer-distributer supported upon one of the said frame parts and means for operating the same, of a seed-holder comprising a receptacle, a tubular connection therefrom to the other of the tubular frame parts and means for securing said parts thereto, a slide-bar having an opening and an adjustable plate for regulating the size of said opening and a link connecting the said slide-bar with the tubular frame part carrying the fertilizer-distributer, substantially as set forth.

2. In a seed-planter and fertilizer-distributer, the combination with the tubular frame parts pivoted together and adapted to move toward and from one another and a seed-holder carried by one of said frame parts, of a fertilizer-receptacle, a tubular spillway, and means for connecting the same and the fertilizer-receptacle to the other of said tubular frame parts, means for regulating the delivery-opening in the fertilizer-receptacle, means for closing the opening therein, a rotary device within the fertilizer-receptacle and means for operating the same by and from the tubular frame part carrying the seed-holder whereby the fertilizer is progressively fed to and delivered from the opening into the tubular frame part and therefrom to the ground, substantially as set forth.

3. In a seed-planter and fertilizer-distributer, the combination with the tubular frame parts pivoted together and adapted to move toward and from one another, and a seed-holder carried by one of said frame parts, of a fertilizer-receptacle, a tubular spillway, and means for connecting the same and the fertilizer-receptacle to the other of said tubular frame parts, a conical feeder within the fertilizer-receptacle having an integral flange, a base and means for connecting the base and the conical feeder to cause them to turn together, a rod connected to the base by which the same and the conical feeder are turned back and forth, an adjustable gate for regulating the amount of fertilizer delivered through the opening in the receptacle, and a separator connected to the said base and moving around outside of the fertilizer-receptacle for closing the opening therein, substantially as set forth.

4. In a seed-planter and fertilizer-distributer, the combination with the tubular frame parts pivoted together and adapted to move toward and from one another, and a seed-holder carried by one of said frame parts, of a fertilizer-receptacle, a tubular spillway, a platform connected with the spillway and coming slightly below the lower end of the fertilizer-receptacle, and bolts for securing the said flange and the tubular spillway to one of the tubular frame parts, and at the same time fixing the relation of the said parts to one another, a conical feeder within the fertilizer-receptacle having an integral flange, a base and means for connecting the base and the conical feeder to cause them to turn together, a rod connected to the base by which the same and the conical feeder are turned back and forth, an adjustable gate for regulating the amount of fertilizer delivered through the opening in the receptacle, and a separator connected to the said base and moving around outside of the fertilizer-receptacle for closing the opening therein, substantially as set forth.

Signed by me this 6th day of December, 1900.

PETER FITZ RANDOLPH.

Witnesses:
   GEO. T. PINCKNEY,
   S. T. HAVILAND.